(12) United States Patent
Kirkman

(10) Patent No.: US 6,276,396 B1
(45) Date of Patent: Aug. 21, 2001

(54) DIRECTIONAL CONTROL VALVES

(75) Inventor: Douglas F Kirkman, Ickenham (GB)

(73) Assignee: Mandeville Engineering Limited, Bershire (GB)

(*) Notice: Subject to any disclaimer, the term of this patent is extended or adjusted under 35 U.S.C. 154(b) by 0 days.

(21) Appl. No.: 09/449,926

(22) Filed: Dec. 2, 1999

(30) Foreign Application Priority Data

Dec. 2, 1998 (GB) .................................................. 9826322

(51) Int. Cl.[7] ................................................. F15B 13/043
(52) U.S. Cl. .................. 137/625.64; 91/426; 137/625.66
(58) Field of Search ..................... 91/426; 137/625.64, 137/625.66

(56) References Cited

U.S. PATENT DOCUMENTS

| | | | |
|---|---|---|---|
| 4,467,833 | * 8/1984 | Satterwhite et al. | 91/426 X |
| 4,548,238 | * 10/1985 | Chorkey | 137/625.66 X |
| 4,601,311 | * 7/1986 | Acker | 137/625.66 |
| 4,848,404 | * 7/1989 | Hickok | 91/426 X |

* cited by examiner

Primary Examiner—Gerald A. Michalsky
(74) Attorney, Agent, or Firm—Nixon & Vanderhye P.C.

(57) ABSTRACT

A directional control valve comprises a spool which is movable in a chamber and which carries shear seals urged against a respective wall of the chamber, the spool being movable between a first position in which a fluid supply inlet is in communication with a functional outlet and a second position in which the fluid supply inlet is cut off from the functional outlet, and a safety piston which is spring-loaded towards engagement with the spool in a sense to move the spool to the second position. An intermediate piston is interposed between the spool and the safety piston so that the intermediate piston can allow relative movement between itself and the spool. The chamber includes a port coupled to a pressure transducer which can monitor the position of the valve spool or the function line pressure.

10 Claims, 1 Drawing Sheet

DIRECTIONAL CONTROL VALVES

FIELD OF THE INVENTION

This invention relates to hydraulically-latched directional control valves particularly sea-water tolerant valves for use in sub-sea operations.

BACKGROUND TO THE INVENTION

Hydraulically-latched directional control valves are known for use in sub-sea operations to provide control over fluid or hydraulically-operated functions. One example of such a valve is shown in GB-2201227-B. Typically, such a valve comprises a spool which is movable to and fro in a chamber and which carries shear seals urged against a respective wall of the chamber, the seals being disposed relative to fluid inlets and outlets to the chamber such that the spool can be moved between a first position, in which a fluid supply inlet is in communication with a functional outlet, and a second position in which the fluid supply inlet is cut off from the functional outlet and may if desired be in communication with a vent passage. It is known to control the movement of the spool between the first and second positions by means of solenoid valves which can supply a pulse of hydraulic pressure from a pilot supply to one or the other end of the spool.

It is also known, and shown by way of example in the aforementioned GB-2201227-B, to provide a safety piston which is spring loaded towards engagement with the spool in a sense to move the spool to a particular end position, particularly that associated with closure in which the fluid inlet is cut off from the functional outlet. The purpose of this safety piston, which is normally loaded by a mechanical spring, is to force the spool to the selected position in the event of failure of the pilot supply. It is necessary under normal operating conditions to supply pressure to the piston so as to move the position in the opposite sense, against the force of the spring and away from the spool, so that in the absence of failure of the pilot supply the safety piston is held away from the valve spool.

SUMMARY OF THE INVENTION

The purpose of the present invention is to avoid undesired movement during certain phases of operation caused by vacuum lock between the safety piston and the valve spool. This is achieved by making the valve spool composite, there being between the spool that carries the shear seals and the safety piston an intermediate piston which is engageable by the piston and is movable relative to the spool body.

Another object of the invention is to provide a construction which favours the use of tungsten carbide sealing parts within relatively soft stainless steel bodies.

Another object of the invention is to provide a means of monitoring either the position of the valve spool or the function line pressure.

Other objects and features of the invention will be apparent from the following description of a specific example of the invention.

BRIEF DESCRIPTION OF THE DRAWING

The single

DETAILED DESCRIPTION

Figure 1:
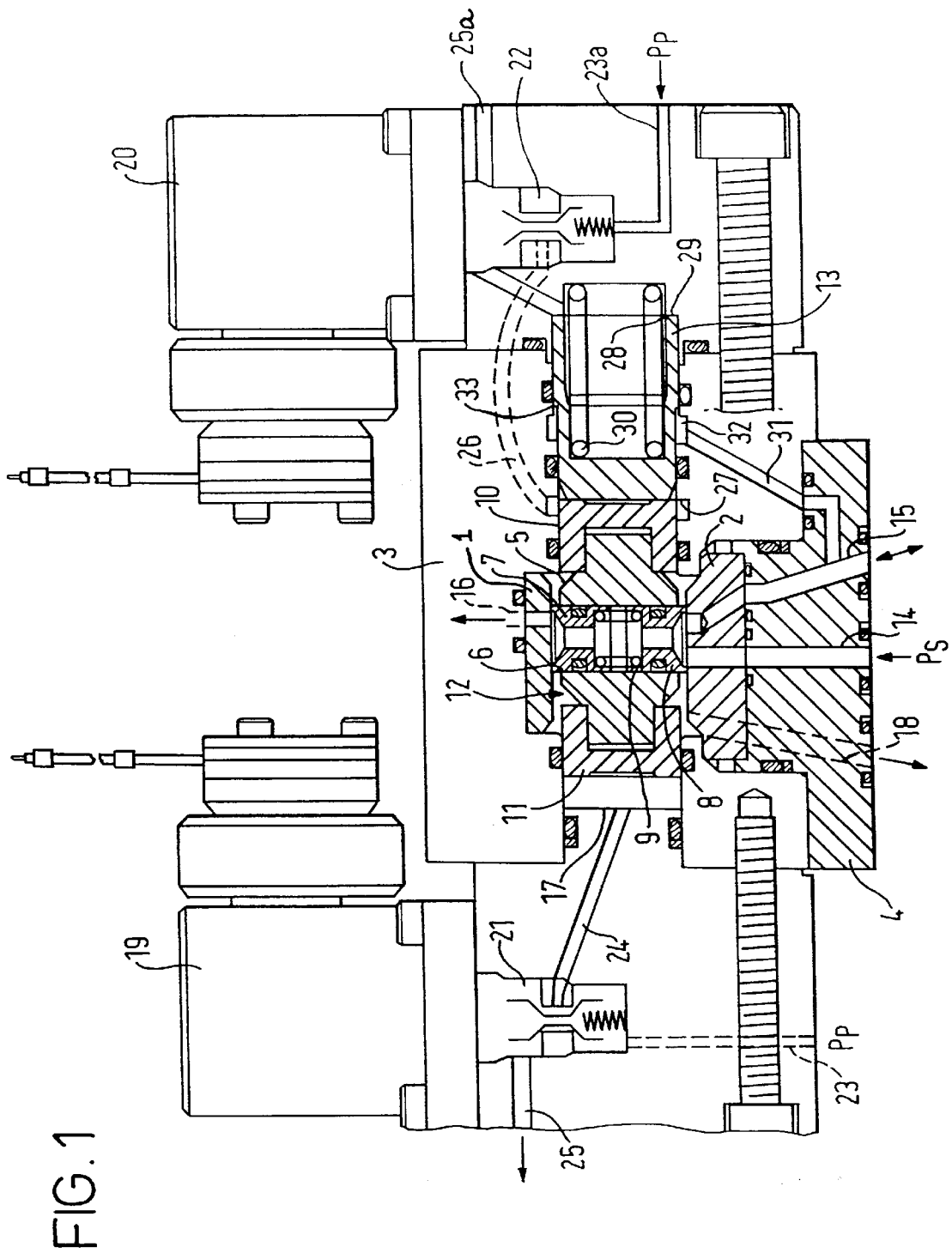
FIG. 1 illustrates in part-sectioned form a directional control valve according to the invention.

The single FIG. 1 shows in part-sectioned form an embodiment of a directional control valve which may be used in a variety of contexts but is particularly intended for use sub-sea, in for example wellhead equipment, particularly to provide a controlled supply of fluid pressure to some pressure operated device.

In the illustrated embodiment, there are two shear plates 1 and 2 disposed within blocks 3 and 4 respectively.

Between the shear seals and movable to and fro parallel to them is a spool 5 which has an aperture 6 extending transverse to the line of to and fro movement, the aperture supporting two circular shear seals 7 and 8 which are separated by a helical spring 9 that urges each of the seals into contact with a respective one of the shear plates. At each end of the spool is a respective intermediate piston 10 and 11 respectively. Each piston is recessed to accommodate the end of the spool and to allow, as explained hereinafter, sliding movement of the spool 5 with respect to the intermediate piston. The pistons 10 and 11 are mounted for sealing and sliding movement.

The spool and valve assembly is intended to have two normal operating positions, corresponding to the left and right extreme positions of the assembly. For the position shown in the drawing, the spool 5 abuts piston 10 and this piston abuts a safety piston 13 to be described later. The shear seals allow hydraulic pressure flow from a fluid inlet 14, extending through block 4 and shear plate 2, to a functional outlet 15 extending through plate 2 and block 4. Pressure may also be allowed to flow through passageway 16 in plate 1 to a pressure measuring transducer (not shown). This transducer may be used to monitor the position of the valve spool 5 or the pressure at the fluid inlet (i.e. the function line pressure) or both.

For the end position of the valve assembly displaced from the position shown, such that piston 11 abuts an end wall 17 of the chamber 12, the shear valves cut off the function outlet 15 from the pressure inlet 14 and, in this embodiment, allow coupling of the inlet 14 to a vent passage 18.

Movement of the valve assembly is under the control of two solenoids 19 and 20 which control respective valve assemblies 21 and 22. Valve assembly 21 may be a needle valve which is spring loaded and which is briefly opened by solenoid 19 to provide a pulse of hydraulic pressure from a pilot supply line 23 via passage 24 to the piston 11, to force the spool to the right-hand end position. When the needle valve closes line 23, passage 24 is connected to a vent 25.

Likewise, solenoid 20 controls valve assembly 22 so that a pulse of hydraulic pressure from a pilot supply 23a flows through a passage 26 to a chamber 27 defined between piston 10 and safety piston 13. This pulse of pressure forces the spool to the left-hand 'closed' position. Valve assembly has a vent passage 25a similar to vent 25.

The piston 13 is a safety device which is provided to ensure that the spool 5 is moved to its left-hand extreme position, cutting off function supply line 15 from hydraulic pressure inlet 14 in the event of failure of the pilot supply and/or the main supply. The piston 13 is hollow. Its end rim 28 abuts a shoulder 29 to define a datum position. The piston 13 contains a helical spring 30 which is at its maximum compression when the piston 13 is in the datum position.

In normal operation, the piston is urged towards its datum position, against the force of the spring 30, by pressure from the function line 15, by way of a branch 31 to an inlet annulus 32 enabling fluid pressure against an annular shoulder 33 on piston 13. The return spring is thereby compressed, allowing the piston 13 to be disengaged from the spool at all values of the line pressure at which the control valve should function.

The division of the spool into a concatenation of relatively movable parts (10, 5 and 11) is the basis of the invention. When for example the valve is used sub-sea and hydraulic pressure is applied to the spool 5, the valve will move the piston 13 to compress the reset spring 30. This motion tends to create in the space between piston 10 and piston 13 a vacuum which causes piston 10 to remain attached to piston 13. If the spool were in one piece, this phenomenon would tend to suck the shear valve assembly into the open condition. However, the relationship between spool 5 and piston 10 allows the piston 10 to move conjointly with the safety piston 13 without causing movement of the spool 5 unless a pulse of pressure in line 26 forces piston 10 and spool 5 away from the safety piston 13.

This construction is favourable for the use of hard, for example 85 Rockwell C hardness, tungsten carbide components within relatively soft, 20 Rockwell C, 18/8 type stainless steel bodies. The use of the latter is desirable in order to avoid corrosion notwithstanding very long periods of use sub-sea. All the sealing surface parts of the shear seals and the seal plates may be of sintered construction and the piston of the composite spool may also be made of sintered tungsten carbide.

What is claimed is:

1. A directional control valve comprising:
   a spool which is movable in a chamber and which carries shear seals urged against a respective wall of the chamber, the spool being movable between a first position in which a fluid supply inlet in communication with a functional outlet and a second position in which the fluid supply inlet is cut off from the functional outlet;
   a safety piston which is spring-loaded towards engagement with the spool in a sense to move the spool to the second position; and
   an intermediate piston is interposed between the spool and the said safety piston so that the intermediate piston can allow relative movement between itself and the spool.

2. A directional control valve according to claim 1 and further comprising means for supplying pulses of hydraulic pressure to said intermediate piston and a second piston to move the spool to and fro between said first and second positions.

3. A directional control valve according to claim 2 wherein said means includes a passage connected to a space between said intermediate piston and said safety piston.

4. A directional control valve according to claim 3 wherein means are provided for supplying fluid pressure to said safety piston to move it in a sense away from the spool.

5. A directional control valve according to claim 1 and including:
   a port for the chamber, positioned so as to be exposed to pressure from the fluid inlet and cut off from said pressure according to the position of the valve spool.

6. A directional control valve comprising:
   a spool which is movable in a chamber and which carriers shear seals urged against a respective wall of the chamber, the spool being movable between a first position in which a fluid supply inlet is in communication with a functional outlet and a second position in which the fluid supply inlet is cut off from the functional outlet;
   fluid pressure supply for supplying fluid pressure pulses to said chamber for moving said spool to and fro between said first position and said second position;
   a safety piston which is mechanically spring-loaded towards engagement with the spool in a sense to move the spool to the second position; and
   an intermediate piston interposed between the spool and said safety piston and slidably coupled to said spool so that the intermediate piston can allow relative movement between itself and the spool.

7. A directional control valve according to claim 6 and further comprising a hydraulic pressure supply for supplying pulses of hydraulic pressure to said intermediate piston and a second piston to move the spool to and fro between said first and second positions.

8. A directional control valve according to claim 7 wherein said hydraulic pressure supply includes a passage connected to a space between said intermediate piston and said safety piston.

9. A directional control valve according to claim 8 wherein a pressure supply is provided for supplying fluid pressure to said safety piston to move it in a sense away from the spool.

10. A directional control valve according to claim 6 and including:
    a port for the chamber, positioned so as to be exposed to pressure from the fluid inlet and cut off from said pressure according to the position of the spool.

* * * * *

UNITED STATES PATENT AND TRADEMARK OFFICE
CERTIFICATE OF CORRECTION

PATENT NO. : 6,276,396 B1  
DATED : August 21, 2001  
INVENTOR(S) : Kirkman

Page 1 of 1

It is certified that error appears in the above-identified patent and that said Letters Patent is hereby corrected as shown below:

Column 3,  
Line 29, -- is -- should be inserted after "inlet".  
Line 37, "is" should be deleted.

Column 4,  
Line 10, "carriers" should be -- carries --.

Signed and Sealed this

Ninth Day of April, 2002

Attest:

Attesting Officer

JAMES E. ROGAN  
Director of the United States Patent and Trademark Office